(12) United States Patent
Norimatsu et al.

(10) Patent No.: US 7,607,838 B2
(45) Date of Patent: Oct. 27, 2009

(54) BEARING APPARATUS FOR A WHEEL OF VEHICLE

(75) Inventors: Takayuki Norimatsu, Shizuoka-ken (JP); Yasuhiro Aritake, Shizuoka-ken (JP)

(73) Assignee: NTN Corporation (JP)

( * ) Notice: Subject to any disclaimer, the term of this patent is extended or adjusted under 35 U.S.C. 154(b) by 341 days.

(21) Appl. No.: 11/195,798

(22) Filed: Aug. 2, 2005

(65) Prior Publication Data
US 2006/0029316 A1 Feb. 9, 2006

(30) Foreign Application Priority Data
Aug. 3, 2004 (JP) .............................. 2004-226282

(51) Int. Cl.
*F16C 33/64* (2006.01)
(52) U.S. Cl. .................................................. 384/544
(58) Field of Classification Search ................ 384/544, 384/589; 29/898.063, 898.066
See application file for complete search history.

(56) References Cited

U.S. PATENT DOCUMENTS

| | | | |
|---|---|---|---|
| 6,422,758 B1 * | 7/2002 | Miyazaki et al. | 384/544 |
| 6,669,374 B2 * | 12/2003 | Miyazaki | 384/537 |
| 2002/0051597 A1 * | 5/2002 | Sera et al. | 384/544 |
| 2003/0002763 A1 * | 1/2003 | Ishida et al. | 384/544 |

FOREIGN PATENT DOCUMENTS

| | | | |
|---|---|---|---|
| JP | 10095203 A | * | 4/1998 |
| JP | 11-129703 | | 5/1999 |
| JP | 2003-13979 | | 1/2003 |
| JP | 2005-291216 | | 10/2005 |

* cited by examiner

*Primary Examiner*—Thomas R Hannon
(74) *Attorney, Agent, or Firm*—Harness, Dickey & Pierce, P.L.C.

(57) ABSTRACT

A vehicle wheel bearing apparatus which limits hoop stress generated in the inner ring during caulking, to below a predetermined level, can improve durability and reliability of the inner ring. Radial expansion of the outer circumferential surface of the inner ring, before and after said plastic deformation, is measured so that the amount of radial expansion of the inner ring is controlled based on a predetermined relationship between the hoop stress and the amount of radial expansion of the inner ring. The hoop stress in the inner member is limited below a predetermined level. Thus, it is possible to easily and exactly control the hoop stress in the inner ring caulked onto the hub. This prevents the generation of cracking or delayed fracture of the inner ring, to provide a bearing apparatus with an inner ring with superior durability and reliability.

4 Claims, 3 Drawing Sheets

Prior Art

BEARING APPARATUS FOR A WHEEL OF VEHICLE

CROSS-REFERENCE TO RELATED APPLICATION

This application claims priority to Japanese Patent Application No. 2004-226282, filed Aug. 3, 2004, which application is herein expressly incorporated by reference.

FIELD OF THE INVENTION

The present invention relates to a vehicle bearing apparatus, such as an automobile, to rotatably support a wheel relative to a suspension apparatus, and more particularly, to a vehicle bearing apparatus which improves durability of an inner ring caulked on a wheel hub of the bearing apparatus.

BACKGROUND OF THE INVENTION

There are two types of vehicle bearing apparatus, one for a drive wheel and one for a driven wheel. Especially in vehicle bearing apparatus that rotatably supports a wheel relative to a suspension apparatus, they are not only required to be made at a low cost but be light weight as well as small size to improve fuel consumption. A representative example of a prior art bearing apparatus for a vehicle driven wheel is shown in FIG. 6.

The bearing apparatus is a so called "third generation" and has a wheel hub 51, an inner ring 52, an outer ring 53, and double row rolling elements 54, 54. The wheel hub 51 has an integrally formed wheel mounting flange 55 at one end. An inner raceway surface 51a and an axially extending portion 51b, extending axially from the inner raceway surface 51a, are also formed on the wheel hub. Hub bolts 56 secure a wheel on the flange 55 and are equidistantly arranged along the periphery of the flange 55.

The inner ring 52 is formed with an inner raceway surface 52a on its outer circumferential surface. The inner ring 53 is press-fit onto the axially extending portion 51b of the wheel hub 51. The inner ring 52 is axially immovably secured to the wheel hub 51, by a caulked portion 51c, to prevent it from falling off of the axially extending portion 51b. The caulked portion 51c is formed by radially outwardly plastically deforming the end portion of the axially extending portion 51b.

A body mounting flange 53b is integrally formed on the outer circumferential surface of the outer ring 53. The outer ring 53 includes double row outer raceway surfaces 53a, 53a on its inner circumferential surface. Double row rolling elements 54, 54 are freely rollably held between the outer raceway surfaces 53a, 53a and the opposing inner raceway surfaces 51a, 52a.

The wheel hub 51 is made of carbon steel including carbon of 0.40~0.80% by weight. The wheel hub 51 is formed with a hardened layer (shown by cross-hatching) in a region from the base of the wheel mounting flange 55 to the axially extending portion 51b through the inner raceway surface 51a. The hardened layer is formed by high frequency induction hardening. The caulked portion 51c remains as its original surface hardness after its forging. The inner ring 52 is made of high carbon chrome bearing steel such as SUJ2 and is hardened to its core by quenching.

Thus, it is possible to realize a vehicle wheel bearing apparatus with low cost which has sufficient durability to prevent damage such as cracks on the caulked portion 51c. Also, the apparatus prevents the generation of a large change in the diameter of the inner ring 52 secured on the wheel hub 51 by the caulked portion 51c. Also, it is possible to reduce the potential of the inner ring 52 from being damaged by the securing work to maintain the preload at an appropriate value. Also, this reduces the number of parts and steps of machining and assembly (see Japanese Laid-open Patent Publication No. 129703/1999).

However, in the bearing apparatus of the prior art, it is impossible to prevent generation of hoop stress in the outer diameter portion 57 of the inner ring 52. This is due to the inner diameter of the inner ring 52 being radially outwardly expanded due to the radially outward plastic deformation of the axially extending portion 51b near the caulked portion 51c during formation of the caulked portion 51c.

It has been proposed, in order to reduce the hoop stress, to suppress the amount of plastic deformation during caulking by changing the configuration of the end portion of the axially extending portion 51b of the wheel hub 51. However, since the caulked portion 51c is required to have strength sufficient only to strongly secure the inner ring 52, even if a large momentum load is applied to the bearing apparatus, a conflicting problem, suppressing the amount of plastic deformation as well as ensuring the strength of the caulked portion, must be simultaneously solved.

When hoop stress is caused in the outer diameter portion 57 of the inner ring 52 and rust is generated in this portion, diffusible hydrogen exists and these circumstances would penetrate into the material of the inner ring 52 destroying its metal grain boundary. Thus, a so-called "delayed fracture" could be caused.

Several methods to measure the hoop stress have been developed. One method is to irradiate X-ray on the outer diameter portion 57 of the inner ring 52 in which maximum hoop stress occurs. Another method is to stick a strain gauge on the outer circumferential surface of the inner ring 52. However, neither method is simple and efficient when considered for use in a mass production process.

SUMMARY OF THE INVENTION

The present invention provides a vehicle wheel bearing apparatus which can limit hoop stress generated in the inner ring during the caulking process below a predetermined level. The invention also improves the durability and reliability of the inner ring.

According to the present invention, a vehicle wheel bearing apparatus comprises an outer member formed with double row outer raceway surfaces on its inner circumferential surface. An inner member includes a wheel hub and an inner ring. The wheel hub has, at one end, a wheel mounting flange. An axially extending portion extends from the wheel mounting flange. The inner ring is fit onto the axially extending portion. The wheel hub and the inner ring include double row inner raceway surfaces on their outer circumferentially surfaces, respectively, which oppose the double row outer raceway surfaces. Double row rolling elements are freely rollably held by cages between the opposing double row inner and outer raceway surfaces. The inner ring is axially immovably secured to the wheel hub by radially outwardly plastically deforming the end portion of the axially extending portion. Hoop stress in the inner member is limited below a predetermined level by measuring a radial expansion of the outer circumferential surface of the inner ring before and after the plastic deformation and by controlling the amount of the radial expansion of the inner ring on the basis of a predetermined relationship between the hoop stress and the amount of radial expansion of the inner ring.

According to the invention, since an outer diameter of the inner ring before and after the plastic deformation is measured, the amount of the radial expansion of the inner ring is controlled based upon the predetermined relationship between the hoop stress and the amount of radial expansion of the inner ring. Thus, a hoop stress in the inner member is limited below a predetermined level. Also, it is possible to easily and exactly control the hoop stress in the inner ring caulked on the hub and to prevent the generation of cracking or the delayed fracture of the inner ring. This provides a bearing apparatus with superior durability and reliability of the inner ring.

Preferably, the relation between the amount of radial expansion of the inner ring and the hoop stress generated in the inner ring is defined by a linear proportional relationship. This enables the hoop stress generated in the inner ring to be measured easily and exactly.

According to the present invention, the wheel hub is made of medium carbon steel including carbon of 0.40~0.80% by weight. A region from the inner raceway surface to the axially extending portion of the wheel hub is formed with a hardened layer. The layer has a surface hardness of 58~64 HRC. The layer is formed by high frequency induction hardening. The caulked portion remains as a non-quenched portion and has a surface hardness below 25 HRC. The inner ring is made of high carbon chrome bearing steel and is hardened to its core by dip quenching to have a surface hardness of 58~64 HRC. This enables the hoop stress generated in the inner ring, by caulking, to be easily and exactly limited below a predetermined level, e.g. 250 MPa.

According to the present invention, the outer circumferential surface of the inboard side portion of the inner ring is formed with a stepped portion of a smaller diameter. This enables the amount of expansion of the stepped portion, exposed to rusty circumstances, to be controlled and also the hoop stress to be limited below a predetermined level.

According to the present invention, an annular recess is formed around the outer circumferential portion of the axially extending portion, prior to caulking, at the end corresponding to the inboard side end of the inner ring. This enables the deformation of the outer circumferential surface to be suppressed especially at the inboard side stepped portion. Also, the strength of the caulked portion is increased as well as the hoop stress generated in the inner ring is reduced.

The vehicle wheel bearing apparatus of the present invention comprise an outer member formed with double row outer raceway surfaces on its inner circumferential surface. An inner member includes a wheel hub and an inner ring. The wheel hub has, at its one end, a wheel mounting flange. An axially extending portion extends from the wheel mounting flange. The inner ring is fit onto the axially extending portion. The wheel hub and the inner ring are formed with double row inner raceway surfaces on their outer circumferential surfaces, respectively, opposing the double row outer raceway surfaces. Double row rolling elements are freely rollably held by cages between the opposing double row inner and outer raceway surfaces. The inner ring is axially immovably secured to the wheel hub by radially outwardly plastically deforming the end portion of the axially extending portion. A hoop stress, in the inner member, is limited below a predetermined level. This is done by measuring a radial expansion of the outer circumferential surface of the inner ring before and after the plastic deformation and by controlling the amount of the radial expansion of the inner ring based on a predetermined relationship between the hoop stress and the amount of radial expansion of the inner ring. Accordingly, it is possible to easily and exactly control the hoop stress in the inner ring, which is caulked onto the hub, and to prevent the generation of cracking or delayed fracture of the inner ring. Thus, the invention provides a bearing apparatus with an inner ring with superior durability and reliability.

The present invention is a vehicle wheel bearing apparatus which comprises an outer member with an integrally formed body mounting flange. Double row outer raceway surfaces are formed on the outer member's inner circumferential surface. An inner member includes a wheel hub and an inner ring. The wheel hub has, at one end, a wheel mounting flange. An inner raceway surface, formed on the wheel hub, opposes one of the double row outer raceway surfaces. Also, an axially extending portion extends from the inner raceway surface on the wheel hub. The inner ring is fit onto the axially extending portion. The inner ring, on its outer circumferential surface, includes the other inner raceway surface which opposes the other of the double row outer raceway surfaces. Double row rolling elements are freely rollably held by cages between the opposing double row inner and outer raceway surfaces. The inner ring is axially immovably secured to the wheel hub by radially outwardly plastically deforming the end portion of the axially extending portion. A hoop stress, in the inner member, is limited below a predetermined level. This is done by measuring a radial expansion of the outer circumferential surface of the inner ring before and after plastic deformation and by controlling the amount of radial expansion of the inner ring based on a predetermined relationship between the hoop stress and the amount of radial expansion of the inner ring.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

The following description of the preferred embodiment(s) is merely exemplary in nature and is in no way intended to limit the invention, its application, or uses.

Figure 1:
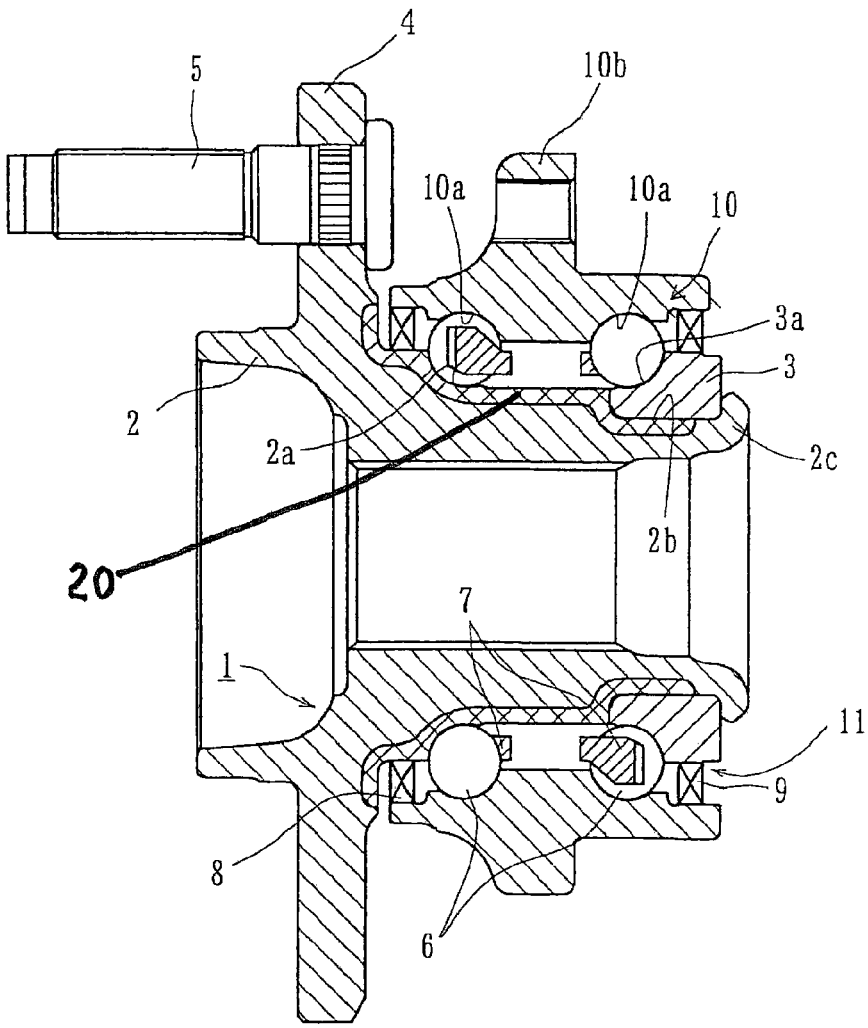
FIG. 1 is a longitudinal section view of a first embodiment of a vehicle wheel bearing apparatus of the present invention.

FIG. 1 is a longitudinal cross-section of a first embodiment of a vehicle wheel bearing apparatus of the present invention. In the description below, the term "outboard side" (a left-hand side in drawings) of the apparatus denotes a side which is positioned outside of the vehicle body. The term "inboard side" (a right-hand side in drawings) of the apparatus denotes a side which is positioned inside of the body when the bearing apparatus is mounted on the vehicle body.

The vehicle bearing apparatus is a so called "third generation" and includes an inner member 1, an outer member 10, and double row rolling elements (balls) 6, 6 rollably contained between the inner and outer members 1 and 10. The inner member 1 includes a wheel hub 2 and an inner ring 3 press-fit onto the wheel hub 2, via a predetermined interference.

The wheel hub 2 has an integrally formed wheel mounting flange 4 to mount a wheel (not shown) at the outboard side end. Hub bolts 5 are equidistantly arranged along the periphery of the flange 4 to secure the wheel hub. The wheel hub 2 is formed with an inner raceway surface 2a on its outer circumferential surface. An axially extending cylindrical portion 2b axially extending from the inner raceway surface 2a of the wheel hub 2. An inner ring 3, formed with an inner raceway surface 3a on its outer circumferential surface, is press-fit onto the axially extending portion 2b of the wheel hub 2. The inner ring 3 is axially immovably secured onto the wheel hub by a caulked portion 2c to prevent it from falling off of the axially extending portion 2b. The caulked portion 2c is formed by radially outwardly plastically deforming the end portion of the axially extending portion 2b.

The outer member 10 includes a body mounting flange 10b integrally formed on its outer circumferential surface. The body mounting flange 10b mounts the outer member 10 onto a body (not shown). Double row outer raceway surfaces 10a and 10a are also formed on the inner circumferential surface of the outer member 10. Double row rolling elements 6, 6 are freely rollably held between the outer and inner raceway surfaces 10a, 10a and 2a, 3a by cages 7, 7. Seals 8 and 9 are arranged at the ends of the outer member 10 to prevent leakage of grease which is contained within the bearing, as well as to prevent the ingress of rain water or dusts from the outside.

The illustrated bearing apparatus is a so-called "third generation type"; however the present invention can also be applied to bearing apparatus of the first and second generation. Here, a pair of inner rings is fitted onto the axially extending portion of the wheel hub. In the illustrated embodiment, a double row angular ball bearing is shown using balls as the rolling elements, however, other bearings such as a double row tapered roller bearings, using tapered rollers as the rolling elements, may be adopted.

The wheel hub 2 is made of medium carbon steel including carbon of 0.40~0.80% by weight such as S53C. A hardened layer 20 is formed on the wheel hub by high frequency induction hardening. The hardened layer 20 has a surface hardness of 58~64 HRC. The hardened layer 20 includes the inner raceway surface 2a of the outboard side, a seal land portion, which contacts the sealing means 8, and the axially extending portion 2b. The caulked portion 2c remains as a non-quenched portion with a surface hardness below 25 HRC after forging. On the other hand, the inner ring 3 is made of high carbon chrome bearing steel such as SUJ2. The inner ring 3 is hardened to its core by dip quenching to have a surface hardness of 58~64 HRC.

The outer member 10 is made of medium carbon steel including carbon of 0.40~0.80% by weight such as S53C. The double raceway surfaces 10a and 10a are hardened by high frequency induction quenching to have a surface hardness of 58~64 HRC.

Figure 2:
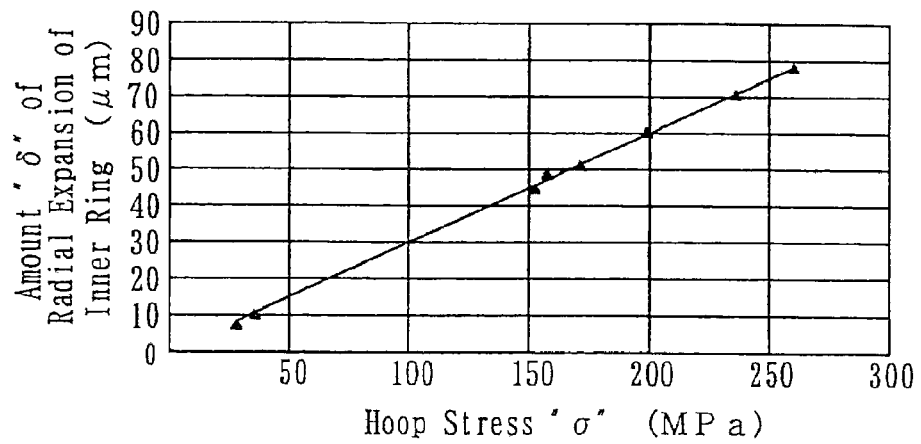
FIG. 2 is a graph illustrating a relationship between hoop stress generated in an inner ring, by caulking, and an amount of radial expansion of the outer circumferential surface of the inner ring.

The present applicant analyzed causes of the generation of hoop stress in the outer diameter portion 11 of the inner ring 3. Also, applicant investigated the relationship between hoop stress σ, generated by the caulking process, and the amount δ of radial expansion of the outer diameter portion 11 of the inner ring 3. As a result, applicant found that the larger the hoop stress σ created by caulking, the larger the amount δ of radial expansion of the outer circumference portion of the inner ring 3. Also, it was found that a substantially linearly proportional relationship exists between the two as shown in FIG. 2. Accordingly, applicant concludes that the hoop stress σ generated in the inner ring 3 can be limited below a predetermined level by controlling the amount δ of radial expansion of the inner ring 3. When the inner ring 3 is used in a condition exposed to the external environment, it is necessary to limit the hoop stress below 250 MPa.

Accordingly, as shown in FIG. 2, the hoop stress σ caused in the outer circumferential portion 11 of the inner ring 3, generated by the caulking process, can be limited below 250 MPa by controlling the radial expansion δ of the portion 11 of the inner ring 3 to below 75 μm. Thus, the criterion for determining the acceptability is set at 75 μm. Accordingly, when the radial expansion δ of the inner ring 3 is below 75 μm, the product (inner ring 3) will be accepted. On the contrary, when the radial expansion δ of the inner ring 3 is over 75 μm, the product will not be accepted. By adopting such a method, it is possible to easily and exactly control the hoop stress σ of the inner ring 3 caulked onto the wheel hub 2. Thus, this limits the hoop stress σ of the inner ring 3 to below a predetermined level. Accordingly, it is possible to prevent the generation of cracking or delayed fracture of the inner ring 3. Thus, the invention provides a vehicle wheel bearing apparatus which improves the durability and reliability of the inner ring 3 caulked onto the wheel hub 2.

In the example above, although it is described that the limiting value of the hoop stress σ is 250 MPa, this occurs under a condition where the inner ring 3 is exposed to the external circumstances. If the inner ring 3 is used in, a circumstance where it is sealed off from the external circumstances, the limiting value of the hoop stress may be set at 300 MPa.

Figure 3:
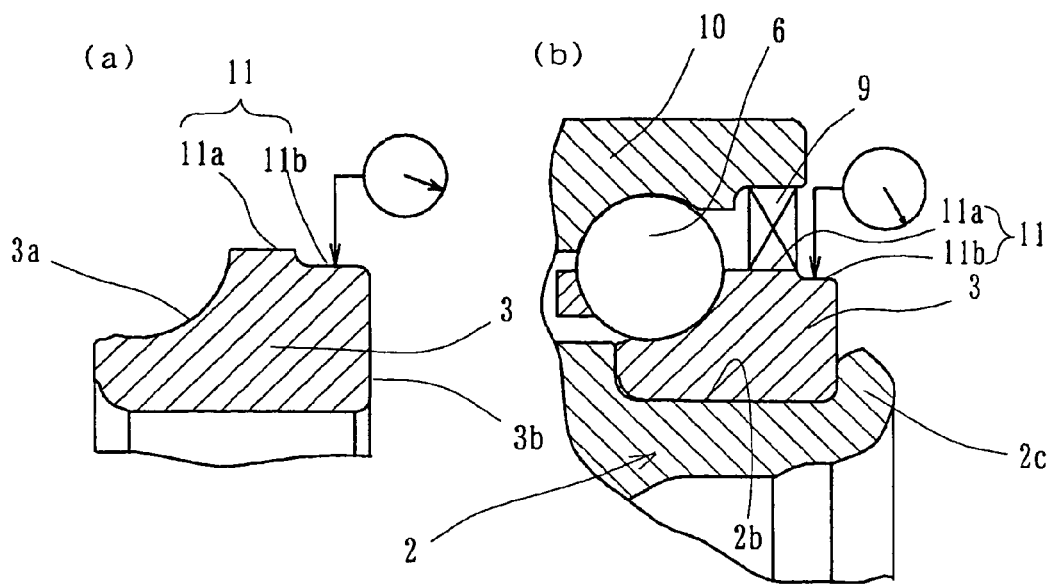
FIG. 3(a) is an explanatory drawing of a cross-section view of an inner ring showing a method for measuring run-out of the outer circumferential surface of the inner ring in its independent condition.
FIG. 3(b) is an explanatory drawing of a cross-section view of an inner ring assembly showing a method for measuring run-out of the outer circumferential surface of the inner ring after caulking.

In the illustrated embodiment, as best seen in FIG. 3(b), a stepped portion 11b is formed on the outer diameter portion 11 at an inboard side from a portion 11a on which the seal 9 is fitted. The diameter of the stepped portion 11b is smaller than that of the portion 11a. This is because the generated hoop stress σ of the inner ring 3 is greatest at the outer circumferential surface. Thus it is possible to limit the hoop stress σ of the inner ring 3 below the predetermined level (value) by controlling the amount δ of the radial expansion of the stepped portion 11b at least exposed to the external circumstances. Of course it is also possible to adopt a structure not having the stepped portion 11b.

Figure 4:
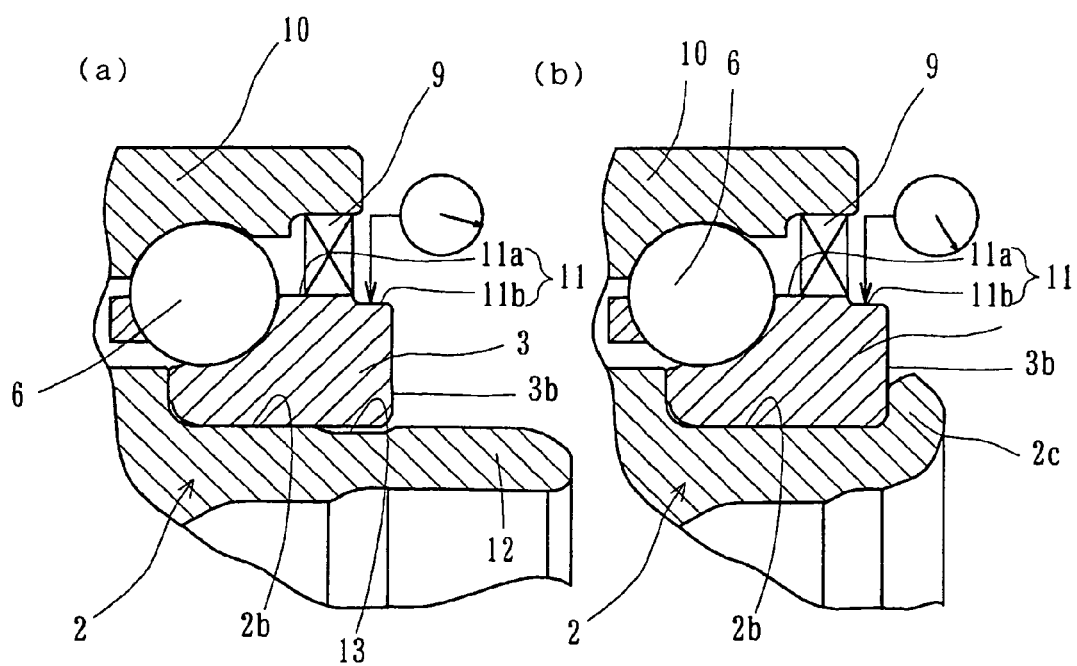
FIG. 4(a) is an explanatory drawing of a cross-section view of an inner ring assembly illustrating a method for measuring the amount of the outer circumferential surface of the inner ring before caulking.
FIG. 4(b) is an explanatory drawing of a cross-section view of an inner ring assembly showing a method for measuring the amount of expansion of the outer circumferential surface of the inner ring after caulking.
Figure 5:
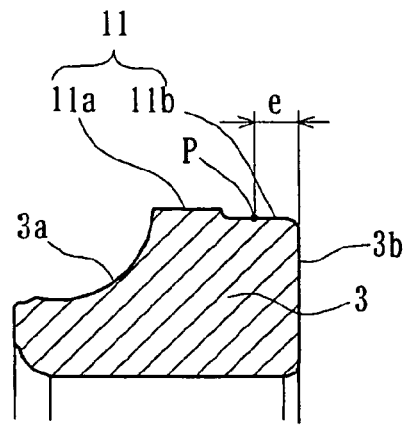
FIG. 5 is an explanatory drawing of a cross-section view of an inner ring showing a position for measuring the amount of the outer circumferential surface of the inner ring.
Figure 6:
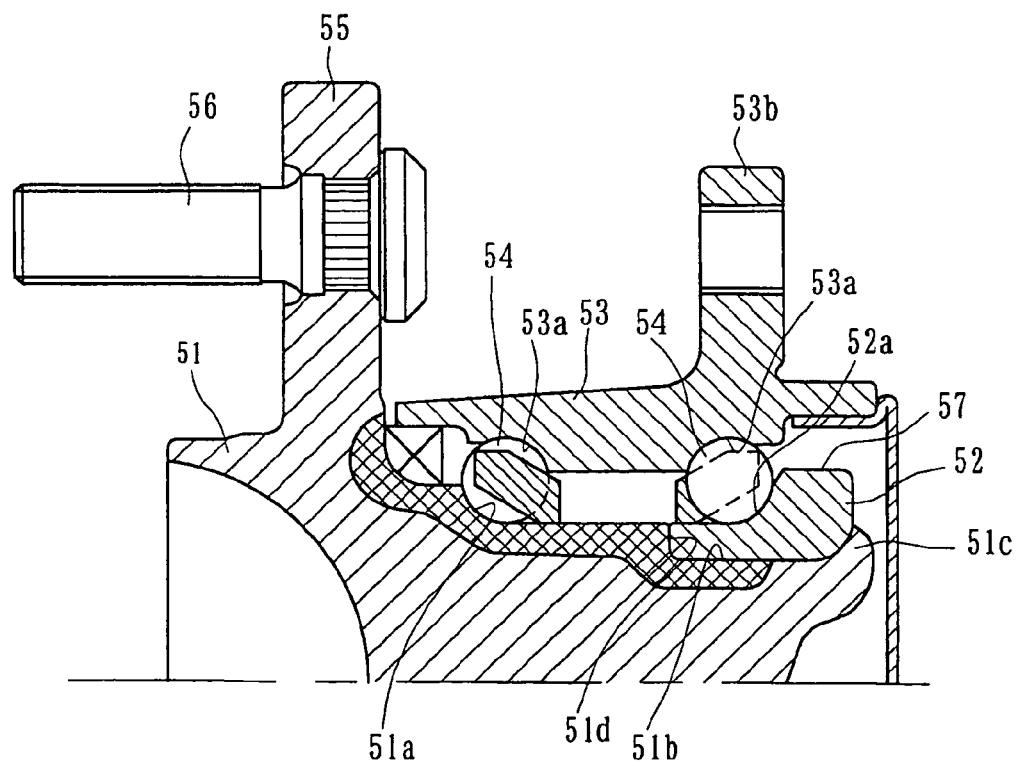
FIG. 6 is a longitudinal section view of a prior art vehicle wheel bearing.

The amount δ of radial expansion of the stepped portion 11b of the inner ring 3 is defined as the difference between a reading of a run-out of the stepped portion 11b of the inner ring 3 in its independent condition, shown in FIG. 3(a), and a reading of a run-out of the stepped portion 11b of the inner ring 3 after caulking shown in FIG. 3(b). The amount δ may be also defined as a difference between readings of run-outs of the stepped portion 11b before and after caulking, as shown in FIGS. 4 (a) and (b). In order to improve the reliability of measured data, it is preferable to previously set the measuring point P at a position at a distance "e" from the end 3b of the inner ring 3.

It has been found that the amount δ of radial expansion of the inner ring 3 is larger toward the inboard side. Thus, an annular recess 13 is formed around the outer circumferential portion of the axially extending portion 2b prior to caulking the end corresponding to the inboard side end of the inner ring 3, as shown in FIG. 4(a). The provision of the annular recess 13 makes it possible to suppress the caulking deformation of the outer circumferential portion 11 of the inner ring 3, especially the deformation of the stepped portion 11b at the inboard side. This increases the strength of the caulked portion 2c as well as reduces the hoop stress σ generated in the inner ring 3. The strength of the caulked portion 2c is defined, for example, by an amount of axial displacement of the inner ring 3 generating the axial force more than 20 kN.

The vehicle bearing apparatus of the present invention can be applied to self-retaining type bearing apparatus of the first through third generations where the inner ring is secure by press-fitting the inner ring onto the axially extending portion of the wheel hub. The end of the axially extending portion of the wheel hub is caulked by plastic deformation.

The present invention has been described with reference to the preferred embodiments. Obviously, modifications and alternations will occur to those of ordinary skill in the art upon reading and understanding the preceding detailed description. It is intended that the present invention be construed as including all such alternations and modifications insofar as they come within the scope of the appended claims or their equivalents.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle wheel bearing apparatus comprising:
   an outer member with double row outer raceway surfaces on its inner circumferential surface;
   an inner member including a wheel hub and an inner ring, said wheel hub having a wheel mounting flange at its one end and an axially extending portion extending from said wheel mounting flange, said inner ring being fitted onto the axially extending portion, and said wheel hub and inner ring each having a double row inner raceway surfaces on their outer circumferential surfaces, respectively, opposing the double row outer raceway surfaces;
   double row rolling elements freely rollably held by cages between the opposing double row inner and outer raceway surfaces;
   said inner ring axially immovably secured by radially outwardly plastically deforming of an end portion of the axially extending portion;
   an annular recess is formed around the outer circumferential portion of the end portion of the axially extending portion prior to caulking the end portion corresponding to the inboard side end of the inner ring, the recess enables suppression of the caulking deformation of the outer circumferential portion of the inner ring on its inboard side, said annular recess deforming during caulking to follow the contour of the inner ring to increase the strength of the caulked portion as well as to reduce a hoop stress generated in the inner ring;
   a hoop stress in the inner member is between 0 to 250 MPa and is determined by measuring a radial expansion of an outer circumferential surface of the inner ring before and after said plastic deformation and by controlling the amount of the radial expansion of inner ring below a predetermined value based on a predetermined relationship between the hoop stress and the amount of radial expansion of the inner ring such that if said predetermine value is exceeded said part is not accepted; and
   said wheel hub is made of medium carbon steel including carbon of 0.40~0.80% by weight and a region from the inner raceway surface to the axially extending portion of the wheel hub being formed with a hardened layer, said hardened layer formed by high frequency induction hardening, said hardened layer having a surface hardness of 58~64 HRC, the plastically deformed portion remains as a non-quenched portion having a surface hardness below 25 HRC, and the inner ring is made of high carbon chrome bearing steel and is hardened to its core by dip quenching to have a surface hardness of 58~64 HRC.

2. A vehicle wheel bearing apparatus of claim 1 wherein the amount of radial expansion of the inner ring is linearly proportional to the hoop stress generated in the inner ring.

3. A vehicle wheel bearing apparatus of claim 1 wherein the outer circumferential surface of inboard side portion of the inner ring is formed with a stepped portion of smaller diameter.

4. A vehicle wheel bearing apparatus comprising:
   an outer member with double row outer raceway surfaces on its inner circumferential surface;
   an inner member including a wheel hub and an inner ring, said wheel hub having a wheel mounting flange at its one end and an axially extending portion extending from said wheel mounting flange, said inner ring being fitted onto the axially extending portion, and said wheel hub and inner ring each having a double row inner raceway surfaces on their outer circumferential surfaces, respectively, opposing the double row outer raceway surfaces; and
   double row rolling elements freely rollably held by cages between the opposing double row inner and outer raceway surfaces;
   said inner ring axially immovably secured by radially outwardly plastically deforming of an end portion of the axially extending portion;
   a hoop stress in the inner member is limited between 0 and 250 MPa and is calculated by measuring a radial expansion of an outer diameter circumferential surface of the inner ring before and after said plastic deformation and by controlling the amount of the radial expansion of the inner ring below a predetermined value based on a predetermined relationship between the hoop stress and the amount of radial expansion of the inner ring such that if said predetermine value is exceeded said part is not accepted; and
   an annular recess is formed around the outer circumferential portion of the axially extending portion of the wheel hub prior to plastically deforming the end corresponding to the inboard side end of the inner ring, the recess enables suppression of the caulking deformation of the outer circumferential portion of the inner ring on its inboard side, said annular recess deforming during caulking to follow the contour of the inner ring to increase the strength of the caulked portion as well as to reduce a hoop stress generated in the inner ring.

* * * * *

UNITED STATES PATENT AND TRADEMARK OFFICE
CERTIFICATE OF CORRECTION

PATENT NO. : 7,607,838 B2
APPLICATION NO. : 11/195798
DATED : October 27, 2009
INVENTOR(S) : Norimatsu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 363 days.

Signed and Sealed this

Twelfth Day of October, 2010

David J. Kappos
*Director of the United States Patent and Trademark Office*